Figure 1:
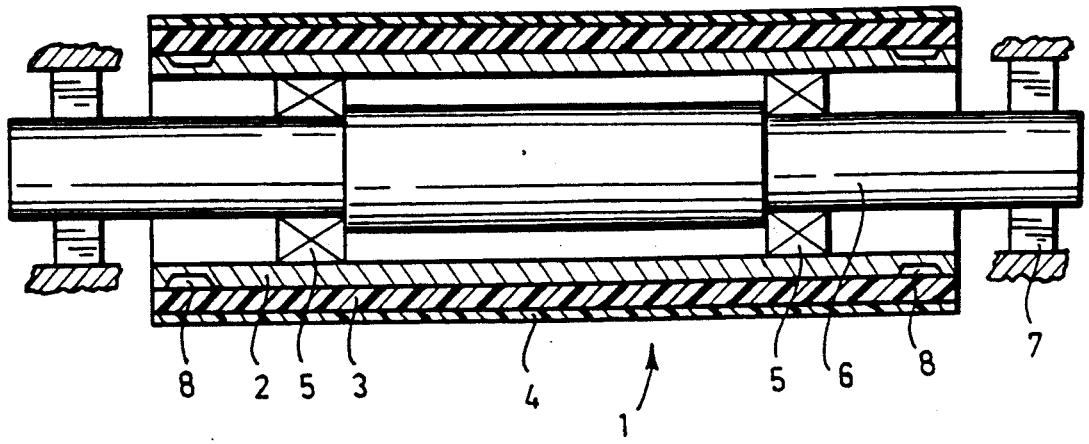

United States Patent [19]

Skyttä

[11] Patent Number: 4,998,333
[45] Date of Patent: Mar. 12, 1991

[54] ROLL FOR THE PRESS IN A PAPER MACHINE OR THE LIKE

[75] Inventor: Osmo Skyttä, Jyväskylä, Finland

[73] Assignee: Oy Tampella AB, Tampere, Finland

[21] Appl. No.: 356,777

[22] Filed: May 24, 1989

[30] Foreign Application Priority Data

Jun. 29, 1988 [FI] Finland .................................. 883110

[51] Int. Cl.⁵ .............................................. B21B 31/08
[52] U.S. Cl. .......................................... 29/130; 29/132
[58] Field of Search ...................... 29/118, 119, 121.1, 29/123, 124, 125, 130, 132

[56] References Cited

U.S. PATENT DOCUMENTS

| | | |
|---|---|---|
| 3,082,683 | 3/1963 | Justus . |
| 3,447,600 | 6/1969 | Greene .................................. 29/132 |
| 3,449,548 | 6/1969 | Adamek et al. ...................... 29/132 |
| 4,484,982 | 11/1984 | Majaniemi . |
| 4,559,106 | 12/1985 | Skyttä et al. .................... 29/121.1 X |
| 4,639,990 | 2/1987 | Schiel et al. ........................... 29/130 |

FOREIGN PATENT DOCUMENTS 70272 2/1986 Finland .
71180 8/1986 Finland .

Primary Examiner—Timothy V. Eley
Assistant Examiner—Frances Chin
Attorney, Agent, or Firm—Ladas & Parry

[57] ABSTRACT

A roll (1) for the press of a paper machine or the like, comprising a substantially rigid cylindrical shell body (2); a resilient layer (3) made of a resilient material such as rubber and positioned on the shell body; and a surface layer (4) positioned on the resilient layer. The resilient layer (3) is formed by fastening profiles (9) made of soft and resilient rubber to the surface of the shell body (2) in such a manner that substantially equally wide conduits (10) are defined between the profiles (9). The surface layer (4), in turn, is fastened to the profiles (9) on to the surface facing away from the shell body (2). In order to cool the resilient layer (3) of the roll (1), water is introduced into the conduits (10) between the profiles (9) through one connection conduit (8).

4 Claims, 1 Drawing Sheet

ROLL FOR THE PRESS IN A PAPER MACHINE OR THE LIKE

The invention relates to a roll for the press section of a paper machine or the like, comprising a substantially rigid cylindrical shell body; a resilient layer fastened to the shell body and comprising cavities for the compression thereof; and a surface layer positioned on the resilient layer and fastened thereto.

In an attempt to extend the press section, press rolls have been covered with thick resilient layers intended to be compressed flexibly within the press section so that a wider press nip is obtained through the deformation. However, the layer of resilient material has to be sufficiently thick and wide so that it can be compressed and that it recovers its original shape after the nip. As a result, the material, which as such is not compressible, is exposed to drastic deformation and the energy so created heats the material during operation. Moreover, the rather soft surface is liable to wear and the entire layer tends to loosen from the surface of the shell body due to the deformation forces and the heat effect.

Attempts have been made to prevent this by constructing the rolls so that there are two or more layers on the shell body, whereby one of the layers is thick and particularly resilient whereas the outermost layer is less resilient but wear-resistant. This kind roll is disclosed in Finnish Patent 71180, for instance. Therein there are provided three layers on the shell body, of which the one in the middle is the proper resilient layer and the outermost layer is a wear-resistant surface layer. In the solution of the citation, the flexibility of the resilient layer is increased by providing it with cavities into which the resilient material compressed in the nip can be displaced. A drawback of the solution is that it is difficult to manufacture because the formation of the cavities regularly within the shell layer is difficult. Furthermore, the resilient layer is still exposed to drastic deformation without sufficient cooling, which results in damages when the resilient layer is loosened.

The object of the present invention is to provide a roll which is simple and easy to realize and the resilient layer of which can be cooled efficiently, so that the roll is reliable in operation and suitable for a press with an extended nip. This is achieved according to the invention in such a manner that the resilient layer is formed by profiles made of a resilient material, such as rubber or the like, the profiles being attached to the shell body longitudinally of the roll and spaced apart from each other so that the distance between adjacent profiles is substantially equal; that the surface layer is fastened to the profiles on to the surface facing away from the shell body so that a continuous conduit is defined between two adjacent profiles; and that cooling medium is arranged to be introduced into each conduit and/or away therefrom through both ends thereof.

The basic idea of the invention is, first, that the resilient layer is formed by rubber profiles easy to fasten to the shell body by vulcanizing or in other suitable manner so that the gap remaining therebetween has a suitable width to form a conduit. When compressed in the nip in the radial direction of the roll, the profiles are thereby able to expand in the peripheral direction of the roll into the conduits defined therebetween, which makes the deformation easier and reduces the amount of the friction heat created. Second, the basic idea of the invention involves that the conduits communicate with a source of cooling medium at both ends of the roll. The cooling medium flows in the conduits, thus cooling the roll and particularly its resilient layer. When the cooling medium flows in between the profiles, the profiles are cooled. In addition, the warmed cooling medium is pumped away from the conduits between the profiles when the profiles are squeezed into the conduits within the press section. Correspondingly, fresh cooling medium is sucked into the conduits when the profiles recover their original shape after the press nip, whereby the cooling of the roll becomes more efficient.

Figure 2:
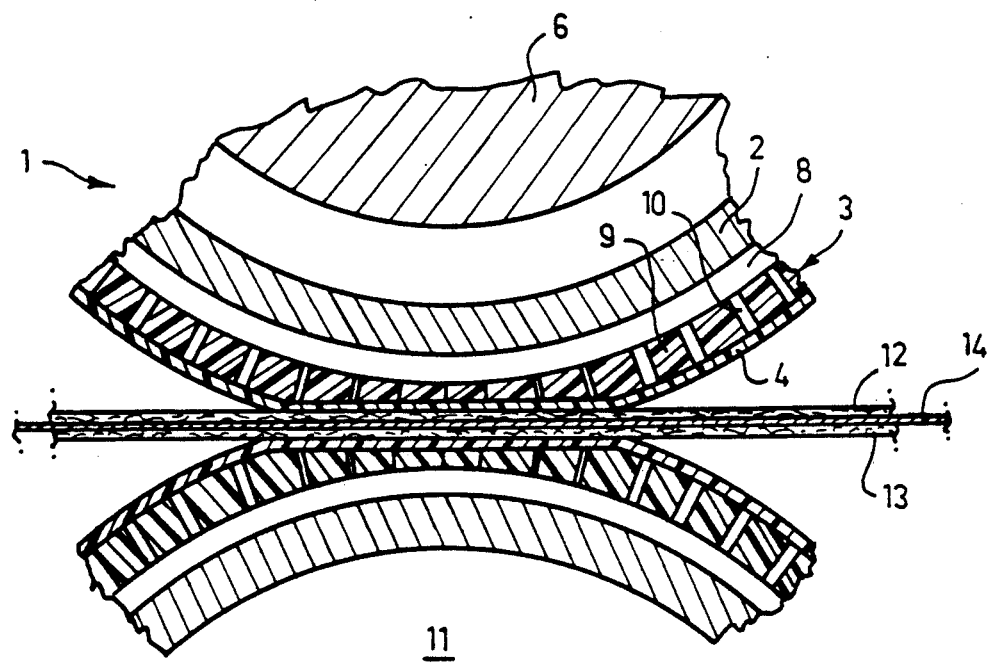

The invention will be described in greater detail in the attached drawings, wherein FIG. 1 is a cross-sectional view of one embodiment of the roll according to the invention; and FIG. 2 is a detailed cross-sectional view of a press nip formed by two rolls according to the invention.

FIG. 1 shows a cross-section of a roll 1 comprising a substantially rigid cylindrical shell body, a resilient layer positioned thereon, and a surface layer attached to the resilient layer upon it. The shell body is mounted on bearings 5 rotatably around a shaft 6 which is mounted unrotatably in a frame 7 of a paper machine or the like. Annular connection conduits 8 are provided in the shell body 2 at both ends of the roll 1. In this particular case, for minimizing the deflection, the bearings of the roll are mounted at a distance from the shell of the roll towards its center at so called Bessel's points, in order to make the press properties of the press as uniform as possible.

As appears from FIG. 2, the resilient layer 3 is formed by resilient profiles 9 which are fastened to the shell body 2 in such a manner that a conduit 10 is defined therebetween. In the press shown in FIG. 2, the press is formed by substantially similar press rolls 1 and 11, the press nip formed between the rolls being substantially planar. Two press felts 12 and 13 are led through the press nip, a web 14 to be dried being positioned between the felts.

When using the roll according to the invention, its connection conduits 8 and the conduits 10 provided between the profiles 9 so as to communicate at both ends of the roll with the respective connection conduit are filled with water by means of water supply means known per se (not shown). When the profile 9 reaches the press section, it is started to be compressed in the radial direction of the roll, whereby the resilient material displaced due to its incompressibility is pressed into the conduit 10 between the profiles, forcing away the water contained therein until the profile passes the center of the press nip, whereafter the expansion of the profile 9 in the radial direction of the roll causes the material to return towards the direction of the original shape of the profile so that fresh water is sucked into the conduit 10. In this way, the profiles heated up can be cooled efficiently, whereby not even a heavy strain causes the profile to be loosened from the surface of the shell body 2. Correspondingly, the conduits 10 between the profiles allow even great deformation of the profiles. However, the deformation distances within the material of the profile are kept within reasonable limits.

The roll according to the invention has been described above by means of one embodiment, in which files. In place of rectangular profiles, profiles of various shapes can be used and they can be chosen so as to suit the material used in each particular case. The profile may be e.g. slightly wedge-shaped or concave or convex on the sides in some direction. Correspondingly, the cooling conduits may be wedge-shaped, rectangular or of some other shape in cross-section, depending on the profile. The resilient layer can be made of highly resilient rubber or other similar material suited for the purpose. The surface layer, in turn, may be made of polyurethane, a composite material or other similar resilient material which nevertheless is wear-resistant and withstands well chemicals and cooling water. In the figure, the profiles of the resilient layer are substantially parallel to the axis of the roll; however, they can be mounted substantially longitudinally of the roll so that the angle at which they deviate from the direction of the axis of the roll may be up to 45°. In of air or some other gas and the conduits between the profiles can directly communicate with ambient air, whereby no feeding means are required, but the compression of the profiles causes a sufficient pumping effect. In addition to roll constructions mounted about an unrotatable shaft at Bessel's points, the invention can likewise be applied in rolls in which end pieces are attached to the ends of the shell of the roll, the shafts positioned in the end pieces being rotatably mounted in the press body of the paper machine or the like.

I claim:

1. A roll (1) for a press section of a paper machine, comprising a substantially rigid cylindrical shell body (2); a resilient layer (3) fastened to the shell body (2) and comprising cavities (10) for the compression thereof; and a surface layer (4) positioned on the resilient layer (3) and fastened thereto, characterized in that the resilient layer (3) is formed by longitudinally extending strips made of a resilient material, the longitudinally extending strips being attached to the shell body (2) longitudinally of the roll (1) and spaced apart from each other so that the distance between adjacent longitudinally extending strips is substantially equal; that the surface layer is fastened to the longitudinally extending strips on to the surface facing away from the shell body (2) so that a continuous conduit (10) is defined between two adjacent longitudinally extending strips; and that cooling medium is arranged to be introduced into each conduit (10) and taken away therefrom through both ends thereof.

2. A roll (1) according to claim 1, characterized in that the cross-sections of the longitudinally extending strips are substantially constant.

3. A roll (1) according to claim 1, characterized in that the longitudinally extending strips are so spaced from each other that when they are positioned at the center of a press nip, they substantially fill the conduit (10) defined therebetween.

4. A roll (1) according to claim 1, characterized in that the roll (1) comprises at both ends thereof an annular connection conduit (8) connecting the conduits (10) between the longitudinally extending strips; and feeding means for feeding cooling medium through one connection conduit (8) into conduits (10) defined between the longitudinally extending strips of the resilient layer (3) and for removing the cooling medium through the connecting conduit (8) positioned at an opposite end of the roll (1).

* * * * *